United States Patent
Hubbard

4,168,427
Sep. 18, 1979

[54] DUPLEX OPTICAL COMMUNICATION SYSTEM WITH REVERSE RAYLEIGH SCATTERED POWER EQUALIZER

[75] Inventor: William M. Hubbard, Colts Neck, N.J.

[73] Assignee: Bell Telephone Laboratories, Incorporated, Murray Hill, N.J.

[21] Appl. No.: 915,148

[22] Filed: Jun. 14, 1978

[51] Int. Cl.² ............................................... H04B 9/00
[52] U.S. Cl. .................................................... 250/199
[58] Field of Search ........................................... 250/199

[56] References Cited
U.S. PATENT DOCUMENTS

| | | | |
|---|---|---|---|
| 3,508,017 | 4/1970 | Unrue | 179/170.2 |
| 3,717,769 | 2/1973 | Hubbard | 250/199 |

OTHER PUBLICATIONS

Mims, III; Forrest M., *LED Circuits and Projects*, New York, Howard W. Sams and Co., Inc., pp. 60–61, 76–77, 122–123.

*Primary Examiner*—Howard W. Britton
*Attorney, Agent, or Firm*—Sylvan Sherman

[57] ABSTRACT

In a duplex optical communication system employing, at each location, the same electrooptic device alternately as a source and as a detector of optical wave energy, and using a single optical fiber to connect pairs of locations, interference produced by reverse Rayleigh scattering along the fiber is minimized by means of R-C equalizers. The modulation signal applied to the electrooptic device (11) during its transmitting period is simultaneously applied to the equalizer (20). During the receiving period, the signal stored in the equalizer is coupled to the local receiver (18), along with the signal from the electrooptic device, wherein it combines destructively with the reverse Rayleigh scattered signal produced along the fiber by the original transmission.

2 Claims, 5 Drawing Figures

DUPLEX OPTICAL COMMUNICATION SYSTEM WITH REVERSE RAYLEIGH SCATTERED POWER EQUALIZER

TECHNICAL FIELD

This invention relates to duplex optical communication systems and, in particular, to equalizers for minimizing the deleterious effects of reverse Rayleigh scattering in such systems.

BACKGROUND OF THE INVENTION

In a book entitled "LED Circuits and Projects," by Forrest M. Mims, III, published in 1973 by Howard W. Sams and Co., Inc., it is proposed that the same electrooptic device be used as both a source and a detector of optical wave energy. In particular, it is noted that an LED used as a detector is sensitive to the same wavelength emitted by an LED composed of the same semiconductor materials when used as a source. Accordingly, a single LED at each end of a communication link can be used alternately as a source and as a detector to provide two-way (i.e., duplex) communication along a single optical transmission line without the need for optical couplers or branching networks. A system of this kind is particularly attractive for use in the subscriber loop network of a telephone system as an inexpensive means of providing two-way communications between the telephone company central office and its local subscribers. A problem with such an arrangement, however, is the reverse Rayleigh scattering inherent in the optical fiber used as the transmission link between office and subscriber.

As disclosed in U.S. Pat. No. 3,717,769, when an optical wave propagates along a fiber, some fraction of the light is reflected back towards the source because of the phenomenon known as Rayleigh scattering. The above-cited patent was particularly concerned with the process called "double-reverse scattering" wherein the scattered energy, trapped within the fiber, is reverse-scattered a second time so that it propagates once again in its original direction towards a remote receiver. Because of the delay, the scattered energy arrives after the original signal, giving rise to an appreciable interference signal.

Of concern here, is the effect upon the system when the single reverse-scattered energy arrives delayed at the source which is now operating in its dual role as a receiver. In this latter case, a similar interference effect is produced by the single reverse-scattered energy as it interferes with the desired signal that originated at the remote station. The problem is similar to that produced by echoes which occur in conventional communication systems. However, in such systems the echo is discretely produced at the remote station and the echo canceller is located at the remote station. See, for example, U.S. Pat. No. 3,508,017. By contrast, Rayleigh scattering is a distributed phenomenon which occurs along the entire length of the transmission path.

SUMMARY OF THE INVENTION

The problem of reverse Rayleigh scattering in a duplex optical communication system is minimized by means of an equalizer located at each transceiver CHARACTERIZED IN THAT the output from the modulator which drives the electrooptic device in its transmitting mode is coupled to the equalizer input, and the output from the equalizer is coupled to the receiver along with the output from the electrooptic device so as to minimize the component of reverse Rayleigh scattered power at the receiver output when the electrooptic device is operating in its receiving mode.

It is shown that the nature of the reverse Rayleigh scattering along the fiber is such that significant interference reduction can be realized with a simple R-C equalizer.

DETAILED DESCRIPTION

Figure 1:
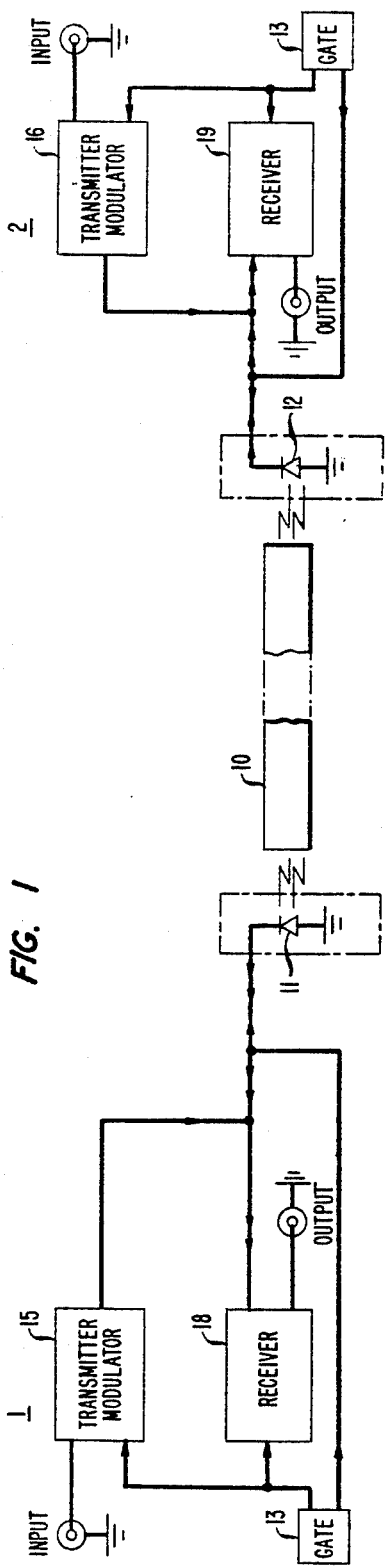
FIG. 1 shows, in block diagram, a duplex optical communication system.

Referring to the drawings, FIG. 1 shows a block diagram of a duplex optical communication system comprising a pair of transceivers 1 and 2 linked together by means of a single optical fiber 10. Each transceiver includes an electrooptic device 11, 12, such as an LED, that serves alternately as either an emitter or a detector of optical energy. The state of each LED is controlled by means of a gate 13, 14 which simultaneously biases the LED in either its emitting or detecting mode and, appropriately, enables and disables the transmitter modulator 15, 16 and the receiver 18, 19 to correspond to the operating mode of the LED.

Gates 13 and 14 are synchronized, taking into account the delay through fiber 10, so that each LED is in its receiving mode when a transmission from the other LED reaches it. Thus, the system permits simultaneous transmission in opposite directions on a time-shared basis.

Figure 2:
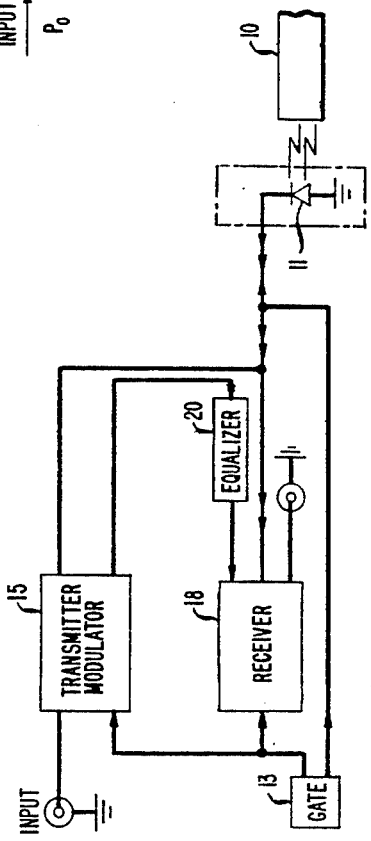
FIG. 2 shows a transceiver modified to include an equalizer in accordance with the present invention.

The difficulty, however, resides in the fact that a transmission propagating between stations gives rise to a reverse-scattered component of signal that is received at the originating station along with the desired transmission from the remote station. This is avoided, in accordance with the present invention, by the addition of an equalizer at each of the transceivers. This modification is illustrated in FIG. 2 which shows transceiver 1 to which there has been added an equalizer 20 connected between the output terminal of transmitter modulator 15 and an input terminal of receiver 18.

In operation, gate 13 simultaneously applies an enabling signal to transmitter modulator 15; a disabling signal to receiver 18; and biases LED 11 in the transmitting mode. This condition persists for a specified period of time during which the light emitted by the LED is amplitude modulated (either pulse or analoque) by transmitter modulator 15. The modulating signal is also applied to equalizer 20. (The flow of gating signal and modulating signal is indicated by the single arrowhead.)

At the conclusion of the transmitting period, gate 13 disables transmitter modulator 15 while enabling receiver 18 and biasing LED 11 in its receiving mode. The LED, during this period, detects and transmits to receiver 18 both the desired optical signal, transmitted from the remote transceiver 2, and the interfering signal produced by the reverse Rayleigh scattering of the signal emitted by transceiver 1. (The flow of received signal is indicated by the double arrow-head.)

Figure 3:
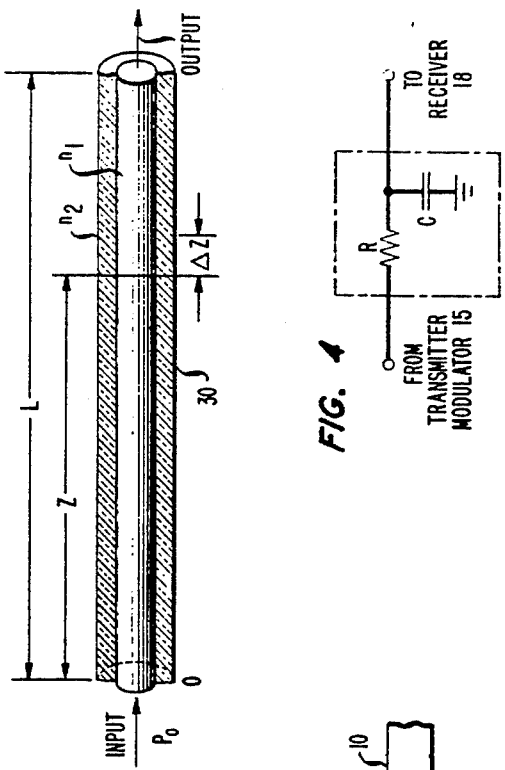
FIG. 3 included for purposes of explanation, shows a length of optical fiber.

The nature of the equalizer is determined by the nature of the Rayleigh scattering. FIG. 3, now to be considered, shows a fiber 30 of length L to which there is applied an input light signal of power $P_o$. If $\alpha_s$ and $\alpha_a$ are, respectively, the scattering loss coefficient per unit length, and the absorption loss coefficient per unit length, the unscattered light power $P_z$, at any arbitrary distance Z along the fiber is given by $$P_z = P_o e^{-(\alpha_s+\alpha_a)Z} = P_o e^{-\alpha Z} \quad (1)$$

where $\alpha = \alpha_s + \alpha_a$.

The power scattered by the incremental portion of fiber $\Delta Z$ is then $$P_o e^{-\alpha Z}(1 - e^{-\alpha_s \Delta Z}). \quad (2)$$

Of this total scattered power, only a fraction f is trapped within the fiber in the form of guided modes having a reverse direction of propagation. Thus, the net reverse-scattered power at point Z is $$\Delta p(Z) = P_o e^{-\alpha Z}(1 - e^{-\alpha_s \Delta Z})f. \quad (3)$$

Expressing e in a Taylor expansion and retaining only the first order term, equation (3) becomes $$\Delta p(Z) = P_o f \alpha_s e^{-\alpha Z} \Delta Z. \quad (4)$$

At the input end, the incremental power is $$\Delta P(Z) = P_o f \alpha_s e^{-2\alpha Z} \Delta Z. \quad (5)$$

where the 2 in the exponent is indicative of the loss incurred by the return trip.

Recognizing that the incremental scattered power $\Delta p'(Z)$ is received during a very short time interval $\Delta t$ starting at a time t following the original transmission, equation (5) can be rewritten in terms of time as $$\Delta p'(t) = P_o f \alpha_s e^{-\alpha v t} \frac{v \Delta t}{2} \quad (6)$$

where v is the velocity of light and $vt = 2Z$.

More generally, it can be shown that for an arbitrary signal having an intensity function P(t') applied at the input to the fiber, the reverse Rayleigh scattered signal at the input is given by $$P(t) = \frac{1}{2}(f\alpha_s v)e^{-\alpha v t} \int_{-\infty}^{t} e^{\alpha v t'} P(t')dt'. \quad (7)$$

If equation (7) is compared with the expression for the response of a simple R-C network to an arbitrary signal P(t'), given by $$E(t) = \frac{1}{RC} e^{-\frac{t}{RC}} \int_{-\infty}^{t} e^{\frac{t'}{RC}} P(t')dt'. \quad (8)$$

we find that the two expressions are identical (aside from a scale factor) when $$RC = (1/\alpha v). \quad (9)$$

Figure 4:
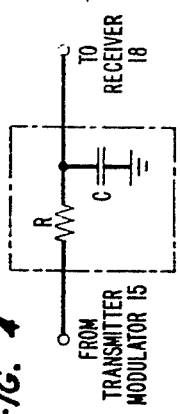
FIG. 4 shows an equalizer in accordance with the present invention.

Thus, in accordance with the present invention, equalizer 20, as shown in FIG. 4, comprises a series resistor R and a shunt capacitor C, whose product is given by equation (9).

Figure 5:
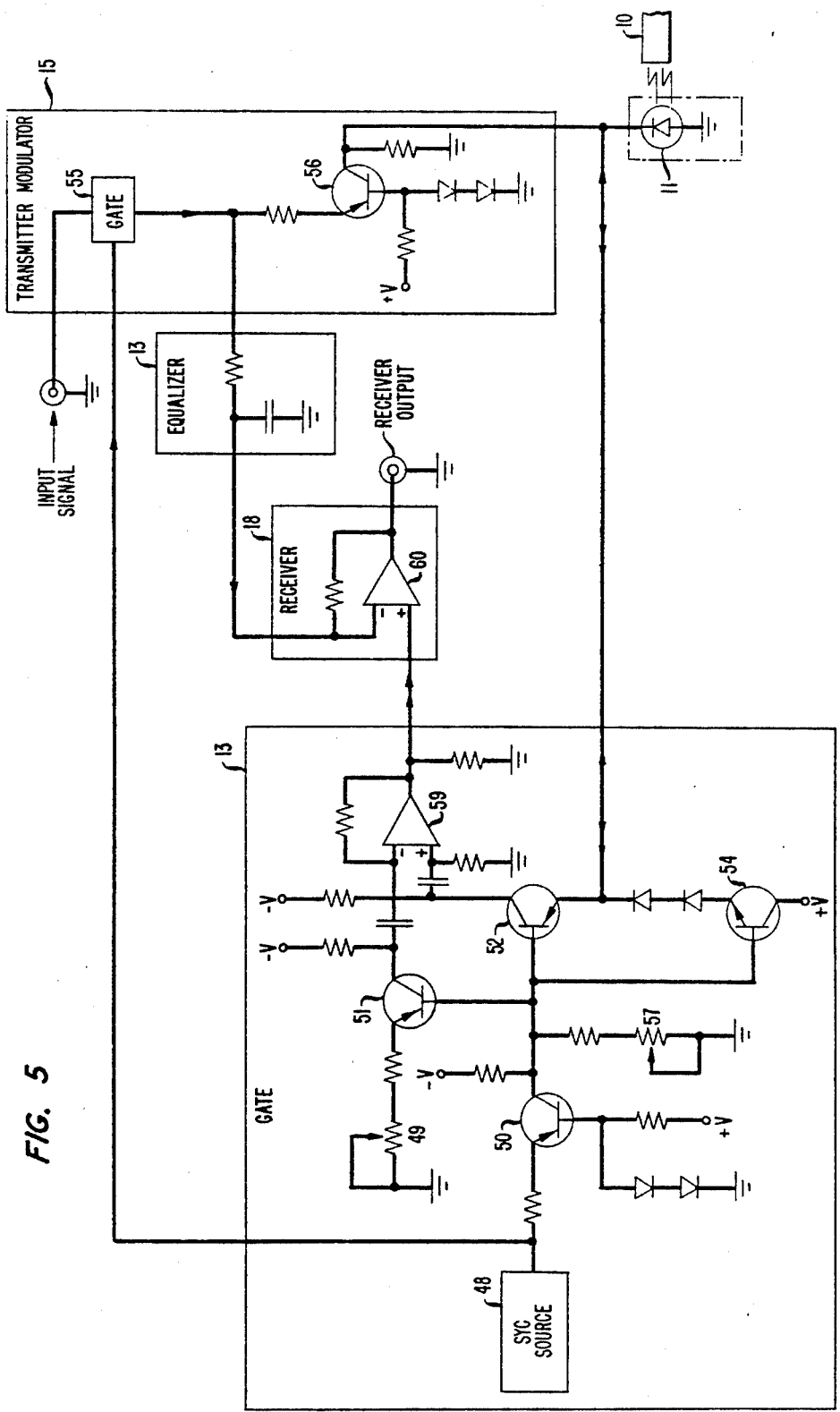
FIG. 5 shows an illustrative embodiment of a transceiver.

FIG. 5, now to be considered, is a circuit diagram illustrating one way of implementing the circuit functions shown in the block diagram of FIG. 1. In operation, a positive signal from a synchronization source 48 drives the collector of transistor 50 in the positive direction, turning transistors 51 and 52 off. Ideally, the voltage across LED 11 would go to zero rapidly, biasing the LED in its transmitting state. However, capacitive effects tend to prevent this. Accordingly, a discharge circuit including transistor 54 is advantageously provided for rapidly discharging the spurious capacitance across the LED.

The LED is now biased to the proper operating point for the type of modulation to be used. For example, if the signal to be transmitted is binary pulse code modulation, the LED is biased to a point just below the value at which emission occurs. Signal pulses would then cause it to emit pulses of light. If the signal to be transmitted in analog intensity modulation, the LED is biased near the middle of its linear region, in which case the signal modulates the light intensity about its nominal value.

The synchronization source also enables a gate 55 in transmitter modulator 15 which couples an information signal to a driver transistor 56 which modulates the LED during the transmitting period. The modulation signal is, simultaneously, applied to the R-C equalizer circuit 13.

The end of the transmitting period occurs when the synchronization signal switches from a positive value to zero. When this occurs the information signal source is disabled. In addition, transistor 50 is turned off and its collector terminal assumes a negative voltage that is determined by the setting of the threshold level control 57. Transistors 51 and 52 are turned on, and the LED is back-biased, thereby switching it from its transmitting to its detecting mode. In this mode, the LED operates as a photodetector whose output is coupled by means of transistors 52 and amplifier 59 to the positive input terminal of differential amplifier 60. The output from the equalizer, which is coupled to the negative input terminal of amplifier 60, combines with the signal received by the LED, which includes a component comprising reverse Rayleigh scattered power. The latter combines out-of-phase with the output from the equalizer and, ideally, is cancelled to produce an interference-free output signal at the output terminal of receiver 18.

When transistor 52 is turned on during the receive period, the resulting change in its collector voltage is coupled to the positive input terminal of amplifier 59 along with the received signal. To eliminate the former, an equal voltage change, produced in the collector circuit of transistor 51, is coupled to the negative input terminal of amplifier 59. The magnitude of this voltage is adjusted by means of a variable resistor 49 located in the emitter circuit of transistor 51.

It will be noted that in the particular embodiment shown in FIG. 5, some circuit components, such as transistor 52, are part of both the gate circuit and the receiver circuit.

While FIG. 3 shows a step index fiber, the scope of this invention is not limited to any particular type of optical fiber.

I claim:

1. In an optical communication system employing a single optical fiber 10, for transmission in both directions, a transceiver (1) comprising;
   an electrooptic device (11), alternatively operated in a transmitting and a receiving mode, optically coupled to one end of said fiber; and
   means (15) for amplitude modulating said device when in the transmitting mode;
   CHARACTERIZED IN THAT
   said transceiver (1) further includes;
   an equalizer (20);
   means for coupling a component of modulating signal from said modulating means (15) to the input of said equalizer (20); and
   means for combining the output from the equalizer (20) and the signal detected by said device (11), when operating in its receiver mode, to minimize the component of reverse Rayleigh scattered power produced along said fiber and detected by said device.

2. The transceiver (1) according to claim 1 CHARACTERIZED IN THAT
said equalizer comprises a series resistor of magnitude R, and a shunt capacitor of magnitude C, such that $$RC = 1/\alpha v;$$

where v is the velocity of light along the fiber;

$$\alpha = \alpha_s + \alpha_a;$$

$\alpha_s$ is the scattering loss coefficient per unit length of fiber; and $\alpha_a$ is the absorption loss coefficient per unit length of fiber.

* * * * *

UNITED STATES PATENT AND TRADEMARK OFFICE
CERTIFICATE OF CORRECTION

PATENT NO. : 4,168,427

DATED : September 18, 1979

INVENTOR(S) : William M. Hubbard

It is certified that error appears in the above-identified patent and that said Letters Patent are hereby corrected as shown below:

Column 1, line 47, "arrixes" should read --arrives--.
Column 2, line 58, "analoque" should read --analogue--.
Column 3, line 15, "$\alpha_2$" should read --$\alpha_s$--; line 28, "e" should read --$e^{-\alpha_s \Delta Z}$--; line 67, "a" should read --$\alpha$--.
Column 4, line 23, "in" should read --is--; line 43, "transistors" should read --transistor--.

Signed and Sealed this

First Day of April 1980

[SEAL]

Attest:

SIDNEY A. DIAMOND

Attesting Officer

Commissioner of Patents and Trademarks